United States Patent [19]

Mahler

[11] Patent Number: 5,409,284
[45] Date of Patent: Apr. 25, 1995

[54] EXTENDABLE SUN VISOR

[75] Inventor: Gert Mahler, Radevormwald, Germany

[73] Assignee: Gebr. Happich GmbH, Wuppertal, Germany

[21] Appl. No.: 940,694

[22] Filed: Sep. 4, 1992

[30] Foreign Application Priority Data

Sep. 9, 1991 [DE] Germany .................. 41 29 689.3

[51] Int. Cl.⁶ ............................................. B60J 3/02
[52] U.S. Cl. ................................. 296/97.4; 296/97.8; 160/100; 160/370.22
[58] Field of Search ................ 296/97.4, 97.8; 160/23.1, 27, 28, 100, 265, 268.1, 370.2 A

[56] References Cited

U.S. PATENT DOCUMENTS

| | | | |
|---|---|---|---|
| 997,600 | 7/1911 | Cabral | 160/268.1 X |
| 2,465,853 | 3/1949 | Dalton, Jr. | 160/265 X |
| 2,874,770 | 2/1959 | Rohr et al. | 296/97.8 X |
| 3,056,626 | 10/1962 | Browne | 296/97.4 X |
| 3,092,174 | 6/1963 | Winn | 296/97.4 |
| 3,343,868 | 9/1967 | Manookian et al. | 296/97.4 |
| 4,825,921 | 5/1989 | Rigter | 160/23.1 |
| 4,909,562 | 3/1990 | Sakuma et al. | 296/97.5 |
| 4,988,139 | 1/1991 | Yamada | 296/97.8 X |
| 5,000,506 | 3/1991 | Abu-Shumays et al. | 296/97.8 |
| 5,033,527 | 7/1991 | Ouvrard et al. | 160/265 X |
| 5,192,110 | 3/1993 | Mykytink et al. | 296/97.8 |
| 5,201,563 | 4/1993 | Liao | 296/97.4 |

FOREIGN PATENT DOCUMENTS

| | | | |
|---|---|---|---|
| 2387812 | 11/1978 | France . | |
| 1973813 | 11/1967 | Germany . | |
| 6809110 | 5/1969 | Germany . | |
| 7301362 | 9/1974 | Germany . | |
| 2603984 | 8/1977 | Germany . | |
| 2815821 | 10/1978 | Germany . | |
| 3415930 | 10/1985 | Germany . | |
| 3518371 | 11/1986 | Germany . | |
| 3532013 | 3/1987 | Germany . | |
| 3608927 | 9/1987 | Germany . | |
| 935984 | 5/1991 | Germany . | |
| 164326 | 7/1991 | Japan | 296/97.4 |
| 1022822 | 6/1983 | U.S.S.R. . | |

Primary Examiner—Robert J. Oberleitner
Assistant Examiner—Andrew C. Pike
Attorney, Agent, or Firm—Ostrolenk, Faber, Gerb & Soffen

[57] ABSTRACT

An extendable sun visor, for the window of a motor vehicle, includes a sunshade windable on a rotatable winding shaft to a retracted position and unwindable from the winding shaft to an extended position. Guide rails are at the lateral sides of the sunshade. A gripping strip to be gripped by a user is attached to the free edge of the sunshade and joins the guide rails. A toothed rack is on each guide rail. A toothed wheel on the winding shaft engages each toothed rack. A spring may normally urge the winding shaft to the sunshade retracted position. A brake may slow retraction. A detent sets the extent of the extension of the guide rails.

24 Claims, 3 Drawing Sheets

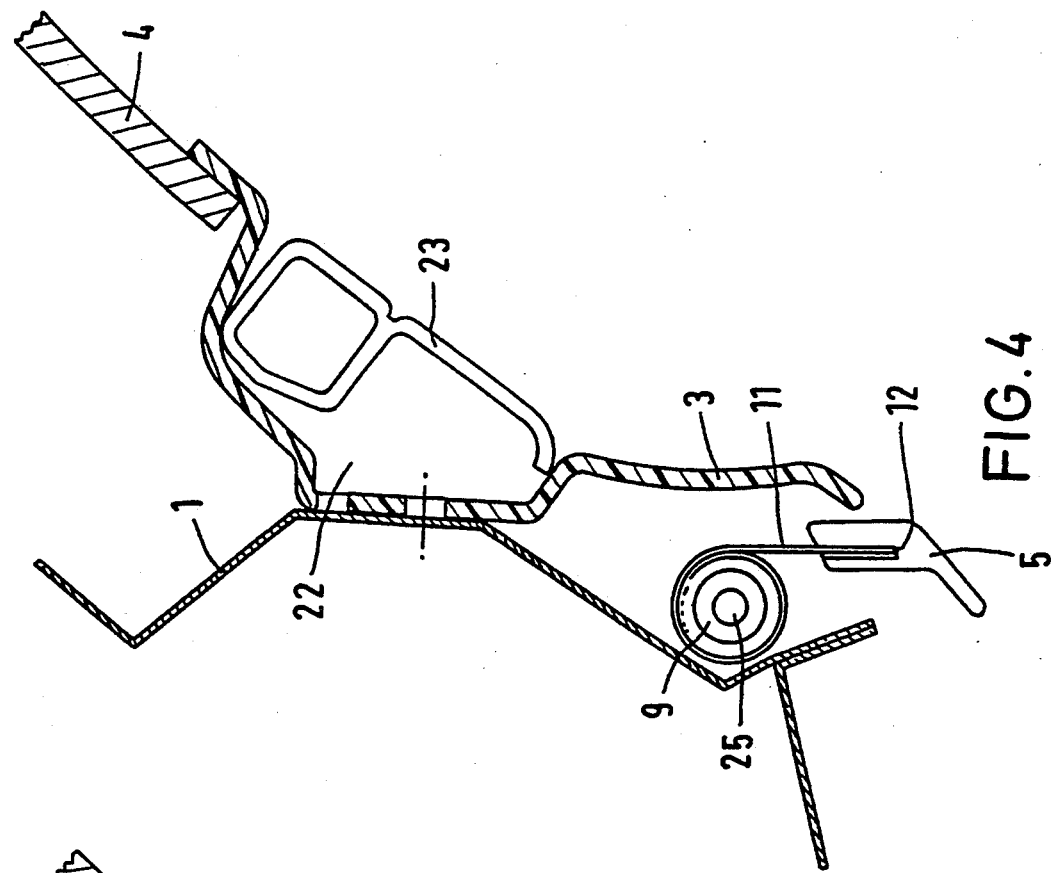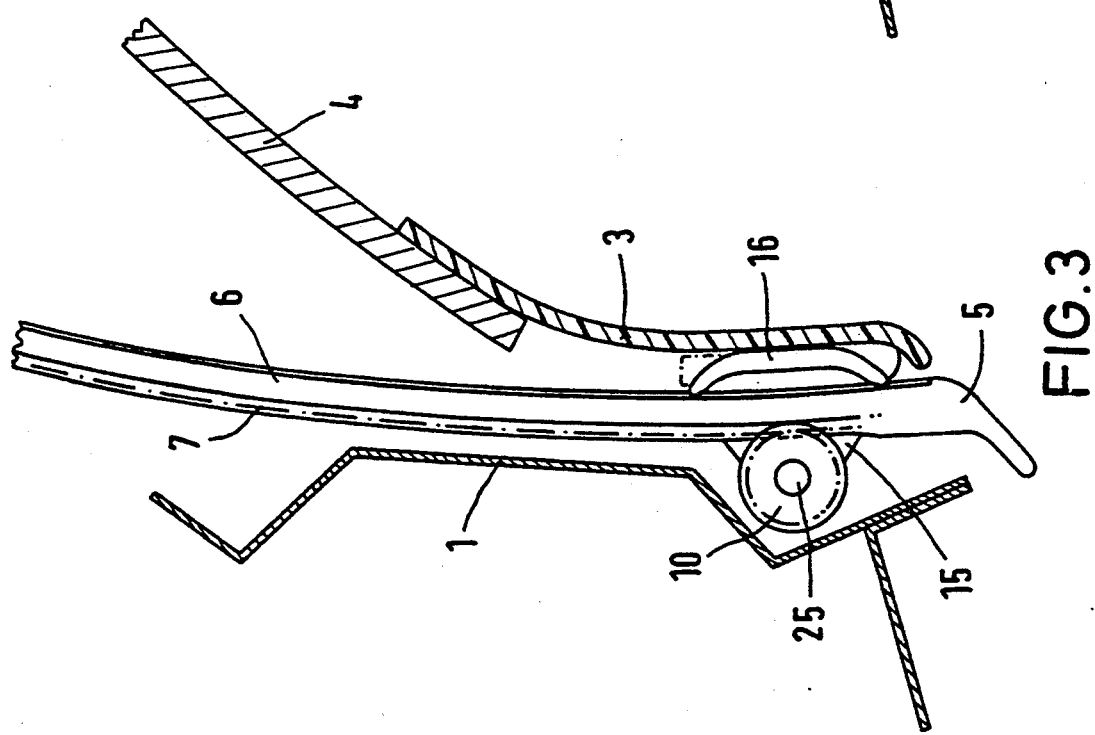

EXTENDABLE SUN VISOR

BACKGROUND OF THE INVENTION

The present invention relates to an extendable and retractable sun visor for use at the windshield, rear window, or side windows of motor vehicles.

As compared with swingable sun visors, extendable sun visors have the advantage that they cover a large area of the windows, can be developed semitransparent to light and, in the retracted position, can be arranged invisibly behind the usual roof lining of the vehicle body.

Known extendable sun visors have the disadvantage that parallel guidance of the visor is difficult to produce so that the known extendable sun visors easily cant. Moreover, other equipment of the vehicle such as air vents, grip troughs for handles, or interior lights cannot be arranged recessed in the roof lining in the region of the retracted sun visors since the extendable sun visor occupies this region when not in use.

SUMMARY OF THE INVENTION

The object of the invention is to provide an extendable sun visor which has reliable parallel guidance and, when in its retracted position, offers space for recessed equipment parts.

An extendable sun visor of the invention includes an extendable sunshade and a guidance element for the sunshade. That guidance element comprises a gripping strip on the sunshade and at least two guide rails toward the lateral sides of the sunshade and also joined by the gripping strip. Winding shaft engaging means, in the form of a rack-like toothing, is formed on each guide rail. A rotatable winding shaft is mounted on the vehicle body. At least two wheels are arranged, fixed for rotation, on the winding shaft, and each engages the winding shaft engaging means on one rail. In particular, each wheel is a toothed gear wheel that engages the toothing of the rack on one of the guide rails. The sunshade is wound around the winding shaft. The sunshade is connected at one of the its edges to the gripping strip. The sunshade covers the space between the guide rails in its extended position.

In the extendable sun visor of the invention, cant-free guidance of the gripping strip and the sunshade is assured by the guide rails and the winding shaft. The gear wheels, which are both fixed for rotation on the winding shaft, together assure that the spaced-apart guide rails always move the same distance when the gripping strip is moved, regardless of whether the gripping strip is grasped at its center or toward one side or one rail. The guidance element, comprising the gripping strip with the lateral guide rails, is of approximately C-shape. The space between the guide rails is covered by the sunshade only when in its extended position and unwound from the winding shaft. When the sunshade is retracted and wound on the winding shaft, that space remains free so that equipment parts, such as air vents, grip troughs for handles, and interior lights, can be arranged in the space bounded by the guide rails and the gripping strip. The equipment parts can extend into that space without interfering with movement of the sun visor.

In order to avoid any entrance of light past the sunshade when the sunshade is in the extended position and in order to adapt the sunshade to the preferably curved shape of the guide rail, the side edges of the sunshade can advantageously lie on the guide rails, i.e., the width of the sunshade is somewhat larger than the distance between the guide rails.

The sun visor can preferably be arranged so that it moves from between a region of the vehicle in the vicinity of a corresponding window and under a lining, like a roof lining, which is fastened to the vehicle, so that in its inserted condition, the sunshade is invisible behind the lining.

The winding shaft can advantageously be supported by two bearing brackets which are fastened to the vehicle, and preferably to the hidden side of the lining facing the roof of the vehicle, so that the sun visor of the invention can be premounted on the lining and fastened, together with the lining, to the roof of the vehicle.

Since the sun visor is adapted to the curvature of the roof of the vehicle, and thus is normally convex toward the roof of the vehicle, it is advantageous for the winding shaft to be arranged on the side of the guidance element which faces away from the lining since, upon being pulled out, the sunshade in this way lies on the guide rails and follows the curvature of the guidance element. By this arrangement, the sunshade is increasingly tensioned as it is pulled out, since the diameter of the sunshade wound on the winding shaft is reduced as it is pulled out. Thus, for the same pulling distance, an increasingly shorter length of sunshade is unwound from the winding shaft.

The sunshade may comprise a light impervious fabric or a foil. Particularly for the side and rear windows, it also may comprise a semi-pervious fabric with a suitable distance between its threads or may comprise a perforated foil. The sunshade can be light reflective on its outside in order to prevent the inside of the vehicle from being heated by radiation from the sun.

Resilient press members can be arranged between the lining and the guide rails for pressing the guide rails against the side edges of the sunshade. The press members are preferably formed integrally with the mounting brackets.

Because the winding shaft is directly engaged via the gear wheels with the rack-like toothing on the guide rails, the winding shaft can pull out and/or push in the sun visor completely automatically by means of an electric motor or semiautomatically by a winding spring which cooperates with the winding shaft. An electric motor, such as a gear motor, can act directly on the winding shaft or it can engage into the rack-like toothing on the guide rails, in which case the winding shaft assures the cant free guidance of the sun visor.

A winding spring which cooperates with the winding shaft serves to wind the sunshade onto the winding shaft and, in this connection, it pulls back the guidance element which comprises the gripping strip and the two guide rails.

In order that the sun visor remain in its pulled out position in this case, a detent element may cooperate with the guidance element. The detent is disengaged directly by hand or indirectly via a push button actuated electromagnet.

In order to avoid excessively fast and noisy retracting movement of the sunshade, a brake can cooperate with the winding shaft of the guidance element. The brake may preferably act only in the direction of retraction, and includes a disk which is arranged in a housing filled with a viscous liquid and is in drive connection with the winding shaft or the rack-like toothing.

Other features and advantages of the present invention will become apparent from the following description of the invention which refers to the accompanying drawings.

BRIEF DESCRIPTION OF THE DRAWINGS

FIG. 3 is a section along the line III—III of FIG. 1, and FIG. 4 is a section along the line IV—IV of FIG. 1.

DETAILED DESCRIPTION OF THE INVENTION

Figure 1:
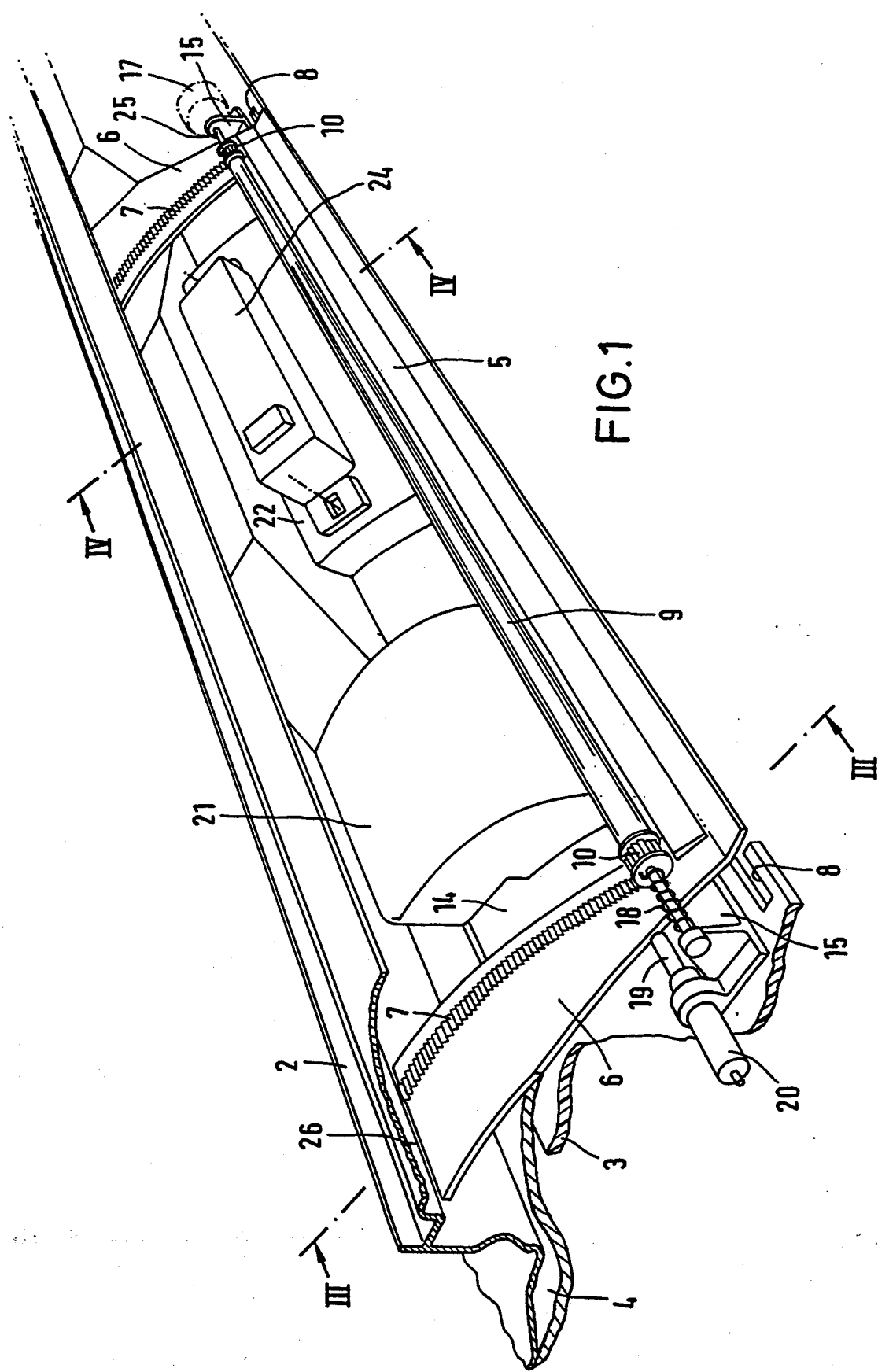
FIG. 1 is a perspective view, partially cut away, of the sun visor in its retracted position.
Figure 2:
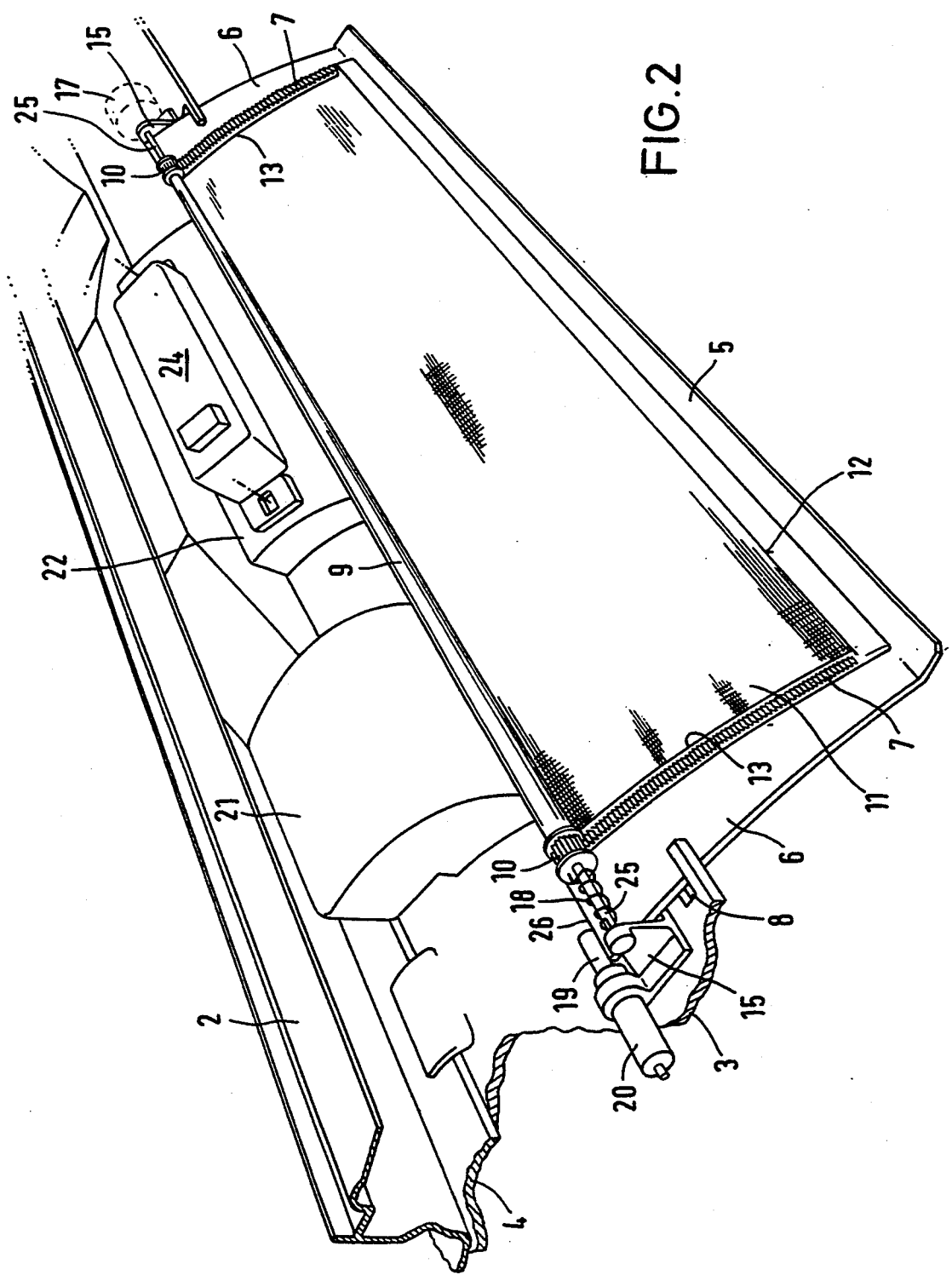
FIG. 2 is a perspective view, partially cut away, of the sun visor in its extended position.

The extendable sun visor embodiment shown refers to a sun visor for the side windows of a motor vehicle. But, it can be employed in analogous manner also for the windshield and/or the rear window. FIGS. 3 and 4 diagrammatically show an upper side member 1 of an automobile roof. A roof plate is fastened on the member 1 in a manner not shown in the drawing. A sliding roof frame 2 is arranged within the roof in order to indicate the region in which the sun visor of the invention can move between the upper edge of a side door of the vehicle and the sliding roof frame 2. Along the side members, the cross members above the windshield and the rear window and the so-called A-columns between the windshield and the front doors, the B-columns between the front doors and the rear doors, and the C-columns between the rear doors and the rear window there is a lining 3 in the form of a surrounding load-bearing plastic frame which serves as mount for equipment elements such as air vents 21, grip troughs 22 for handles 23, or interior lights 24, as well as for a roof canopy 4.

The sun visor of the invention includes a guidance element in the form of a gripping strip 5 which joins spaced apart, laterally bent, and convexly curved guide rails 6. On the side of the rails facing away from the lining 3 there are parallel rack like toothings 7.

The gripping strip 5 with the guide rails 6 is guided in a slot 8 in the lining 3. In the retracted position of the sunshade, the gripping strip 5 extends only far enough out of the slot 8 so that it can be grasped by a hand. In the vicinity of and just inside the slot 8, there is a winding shaft 9 for a sunshade 11. The winding shaft 9 is mounted for rotation by means of stub shafts 25 in bearing brackets 15. The bearing brackets 15 are fastened to the side of the lining 3 facing the roof of the car so that the sun visor can be mounted on the lining 3 and then fastened to the upper side member. Toward each end of the winding shaft 9 there are gear wheels 10 which are fixed for rotation on the shaft and which mesh with respective rack-like toothing 7 on the guide rails 6. In this way, the guide rails 6 are moved positively in synchronism when the sun visor is pulled out by means of the gripping strip 5, so that canting of the sunshade is not possible.

The sunshade 11 has a free edge 12 which is fastened to the gripping strip 5. It has side edges 13 which rest on an edge region of the curved guide rails 6 and are adapted to the convex shape of the guide rails 6. This avoids the formation of an undesired light slit between the sunshade 11 and the guide rails 6. The side edges 13 of the sunshade 11 always lie taut on the guide rails 6 because the diameter of the sunshade 11 wound on the winding shaft 9 decreases upon the unwinding and thus a shorter length of the sunshade 11 is unwound from the winding shaft 9 during each revolution toward the end of the pulling out movement than corresponds to the pulling out movement of the gripping strip 5 with the guide rails 6.

Flutter free guidance of the sun visor can be obtained by resilient pressing elements 16 which can be made integral with the mounting brackets 15.

An electric motor 17 or a brake in the form of a disk arranged in a housing filled with a viscous liquid can be coupled to a stub shaft 25. By means of the electric motor 17, which is developed as a gear motor, the sun visor of the invention can be pulled in and out by depressing a button, while a winding spring 18 can be provided if a brake, instead of an electric motor 17, is coupled to the stub shaft 25. In such a case, the sun visor can be pulled out by hand by means of the gripping strip 5 until a detent pin 19 engages behind a detent edge 26 on a guide rail 6. By the unwinding of the sunshade 11 from the winding shaft 9, the winding spring 18 is tensioned so that the sun visor is pulled back into its original position upon the retraction of the detent pin 19, such retraction being done, for instance, by means of a solenoid 20. The sunshade 11 is wound onto the winding shaft 9 by the winding spring 18 which causes the winding shaft 9 to rotate and the sunshade carries the gripping strip 5 together with the guide rails 6 along with it.

In order to avoid an unpleasant noisy snap back of the sun visor, the rotation of the winding shaft is braked to an acceptable speed by the brake.

FIGS. 1 and 4 show that the space 14 between the guide rails 6 remains completely free in the inserted position, since the winding shaft 9 with the sunshade 11 wound on it is located in the region of the gripping strip 5. This space 14 can therefore be used in order to arrange equipment elements there such as an air vent 21, a grip trough 22 for a handle 23, or an interior light 24.

The sunshade 11 can comprise an opaque or semi-opaque foil or a fabric. The foil can be perforated, while the fabric can be woven with such a distance between its threads that it appears semitranslucent. The foil or fabric can be coated on its outside so as to be light reflective in order, in this way, to reflect incident sun rays and thereby reduce the heating of the inside of the car.

The guide rails 6, together with the rack-like toothing 7 thereon, can extend obliquely so as to achieve an oblique pulling out movement of the sun visor, which is advantageous in order to be able to cover the regions of the window in the vicinity of the obliquely extending A-columns. At the same time, the winding shaft 9, together with the sunshade 11, can be displaceable axially, as described in German OS 38 13 153 of the assignee of the present application, in order to achieve the corresponding movement of the winding shaft 9 with the sunshade 11.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A visor for use in a vehicle, the visor comprising: a sunshade having opposite first and second edges;

winding means including a winding shaft, the winding means being connected to the first edge and onto which the sunshade is windable, wherein the sunshade has a retracted position where it is wound on the winding means and an extended position where it is unwound from the winding means;

guiding means for guiding the sunshade to move between the retracted and extended positions without canting; the guiding means including two guide rails spaced apart across the width of the sunshade, and a connector connected to the second edge of the sunshade and extended between the guide rails so that the guide rails, the connector, and the sunshade all move together; and respective engagement means between the winding means and each of the guide rails such that movement of the connector and the guide rails in turn move the engaged winding means so that the sunshade is extended or retracted with respect to the winding means without canting as the connector and the guide rails are all moved together, the engagement means includes each guide rail having a rack thereon, and a respective wheel on the winding shaft at each of the guide rails and in engagement with the respective guide rail so that movement of the guide rails acts through the racks and the wheels on the winding shaft to rotate the winding shaft and rotation of the winding shaft moves the guide rails and the sunshade.

2. The visor of claim 1, wherein the connector is a gripping strip adapted to be gripped by a user for moving the sunshade between its retracted and extended positions.

3. The visor of claim 1, wherein each rack is a toothed rack and each wheel on the winding shaft is a respective toothed wheel in engagement with the respective rack.

4. The visor of claim 1, wherein the sunshade width covers the space between the guide rails.

5. The visor of claim 4, wherein the sunshade has opposite side edges which rest on the respective guide rails.

6. The visor of claim 5, wherein the guide rails are curved convexly.

7. The visor of claim 1, wherein the guide rails are curved convexly.

8. The visor of claim 1, further comprising motor drive means for moving the sunshade between the retracted and the extended positions.

9. The visor of claim 8, wherein the motor drive means comprises an electric motor.

10. The visor of claim 8, wherein the motor drive means is coupled with the winding means for rotating the winding means.

11. The visor of claim 1, further comprising a brake for braking the sunshade as it is moving from the extended to the retracted positions.

12. The visor of claim 11, wherein the brake cooperates with the winding means.

13. The visor of claim 1, wherein the two guide rails define a space between the guide rails which is covered by the sunshade only when the sunshade is in the extended position.

14. A visor for use in a vehicle, the visor comprising:
a sunshade having opposite first and second edges;
winding means including a winding shaft, the winding means being connected to the first edge and onto which the sunshade is windable, wherein the sunshade has a retracted position where it is wound on the winding means and an extended position where it is unwound from the winding means;

guiding means for guiding the sunshade to move between the retracted and extended positions without canting; the guiding means including two guide rails spaced apart across the width of the sunshade, and a connector connected to the second edge of the sunshade and extended between the guide rails so that the guide rails, the connector, and the sunshade all move together;

respective engagement means between the winding means and each of the guide rails such that movement of the connector and the guide rails in turn move the engaged winding means so that the sunshade is extended or retracted with respect to the winding means without canting as the connector and the guide rails are all moved together;

a winding spring cooperating with the winding shaft and opposing the movement of the sunshade to the extended position; and a detent element operable into engagement with the guiding means for retaining the sunshade in a selected extended position.

15. The visor of claim 14, further comprising a brake for braking the sunshade as it is moving from the extended to the retracted positions.

16. A visor for use in a vehicle, the visor comprising:
a sunshade having opposite first and second edges;
winding means including a winding shaft, the winding means being connected to the first edge and onto which the sunshade is windable, wherein the sunshade has a retracted position where it is wound on the winding means and an extended position where it is unwound from the winding means;

guiding means for guiding the sunshade to move between the retracted and extended positions without canting; the guiding means including two guide rails spaced apart across the width of the sunshade, and a connector connected to the second edge of the sunshade and extended between the guide rails so that the guide rails, the connector, and the sunshade all move together;

respective engagement means between the winding means and each of the guide rails such that movement of the connector and the guide rails in turn move the engaged winding means so that the sunshade is extended or retracted with respect to the winding means without canting as the connector and the guide rails are all moved together;

a winding spring cooperating with the winding shaft and opposing the movement of the sunshade to the extended position;

a detent element operable for retaining the sunshade in a selected extended position; and electromagnetic actuation means for electromagnetically actuating the detent element to remove detent holding of the sunshade against the urging of the winding spring.

17. An apparatus comprising:
a vehicle comprising a window;
a sunshade mounted on the vehicle adjacent the window, the sunshade having opposite first and second edges;
winding means including a winding shaft, the winding means being connected to the first edge and onto which the sunshade is windable, wherein the sunshade has a retracted position where it is wound on the winding means and an extended position where it is unwound from the winding means;

guiding means for guiding the sunshade to move between the retracted and extended positions without canting; the guiding means including two guide rails spaced apart across the width of the sunshade and defining a space between the guide rails which is covered by the sunshade only when the sunshade is in the extended position, and a connector connected to the second edge of the sunshade and extended between the guide rails so that the guide rails, the connector, and the sunshade all move together; and respective engagement means between the winding means and each of the guide rails such that movement of the connector and the guide rails in turn move the engaged winding means so that the sunshade is extended or retracted with respect to the winding means without canting as the connector and the guide rails are all moved together, the engagement means comprising each guide rail including a rack thereon, and a respective wheel on the winding shaft at each of the guide rails and in engagement with the respective guide rail so that movement of the guide rails acts through the racks and the wheels on the winding shaft to rotate the winding shaft and rotation of the winding shaft moves the guide rails and the sunshade.

18. The apparatus of claim 17, further comprising mounting brackets in the vehicle, the mounting brackets supporting the winding shaft stationary in position with respect to the vehicle and rotatable.

19. The apparatus of claim 18 wherein the mounting brackets are fastened on a lining of the vehicle facing a roof of the vehicle.

20. The apparatus of claim 17, wherein the winding means and the guide rails are respectively so placed that the movement of the sunshade to the extended position is movement thereof from a region of the roof of the vehicle in the vicinity of the window of the vehicle past a lining inside the vehicle.

21. The apparatus of claim 17, wherein there is a space between lining of the vehicle and roof of the vehicle and the winding means is arranged on the side of the guiding means which faces away from the lining and is toward the roof.

22. The apparatus of claim 21, further comprising resilient press elements between the lining inside the roof of the vehicle and the guide rails for pressing the guide rails against the side edges of the sunshade.

23. An apparatus comprising:
a vehicle comprising a window;
a sunshade mounted on the vehicle adjacent the window, the sunshade having opposite first and second edges;
winding means connected to the first edge and onto which the sunshade is windable, wherein the sunshade has a retracted position where it is wound on the winding means and an extended position where it is unwound from the winding means;

guiding means for guiding the sunshade to move between the retracted and extended positions without canting; the guiding means including two guide rails spaced apart across the width of the sunshade and defining a space between the guide rails which is covered by the sunshade only when the sunshade is in the extended position, and a connector connected to the second edge of the sunshade and extended between the guide rails so that the guide rails, the connector, and the sunshade all move together;

respective engagement means between the winding means and each of the guide rails such that movement of the connector and the guide rails in turn move the engaged winding means so that the sunshade is extended or retracted with respect to the winding means without canting as the connector and the guide rails are all moved together; and a lining inside the roof of the vehicle at which the sunshade is disposed, vehicular equipment elements being positioned on the vehicle lining between the guide rails.

24. A visor for use in a vehicle, the visor comprising:
a sunshade having opposite first and second edges;
winding means comprising a winding shaft, the winding means being connected to the first edge and onto which the sunshade is windable, wherein the sunshade has a retracted position where it is wound on the winding means and an extended position where it is unwound from the winding means;

guiding means for guiding the sunshade to move between the retracted and extended positions without canting; the guiding means including two guide rails spaced apart across the width of the sunshade and defining a space between the guide rails which is covered by the sunshade only when the sunshade is in the extended position, and a connector connected to the second edge of the sunshade and extended between the guide rails so that the guide rails, the connector, and the sunshade all move together; and respective engagement means between the winding means and each of the guide rails such that movement of the connector and the guide rails in turn move the engaged winding means so that the sunshade is extended or retracted with respect to the winding means without canting as the connector and the guide rails are all moved together, the engagement means comprises each guide rail including a rack thereon, and a respective wheel on the winding shaft at each of the guide rails and in engagement with the respective guide rail so that movement of the guide rails acts through the racks and the wheels on the winding shaft to rotate the winding shaft and rotation of the winding shaft moves the guide rails and the sunshade.

* * * * *